United States Patent [19]

Seymour

[11] 4,432,782
[45] Feb. 21, 1984

[54] SUPPORT FOR HOT GLASS SHEETS OF NON-RECTANGULAR OUTLINE PRIOR TO BENDING

[75] Inventor: Samuel L. Seymour, Oakmont, Pa.

[73] Assignee: PPG Industries, Inc., Pittsburgh, Pa.

[21] Appl. No.: 389,312

[22] Filed: Jun. 17, 1982

[51] Int. Cl.³ ............................................. C03B 23/035
[52] U.S. Cl. ...................................... 65/25.2; 65/25.4; 65/104; 65/106; 65/182.2; 65/273; 65/286
[58] Field of Search .............. 65/104, 106, 245, 182.2, 65/273, 286, 25.2, 25.4

[56] References Cited

U.S. PATENT DOCUMENTS

| | | | |
|---|---|---|---|
| 3,468,645 | 9/1969 | McMaster et al. | 65/25 |
| 3,682,613 | 8/1972 | Johnson et al. | 65/289 |
| 3,846,104 | 11/1974 | Seymour | 65/104 |
| 3,869,271 | 3/1975 | Shaffer et al. | 65/182.2 X |
| 4,204,853 | 5/1980 | Seymour | 65/106 |
| 4,229,200 | 10/1980 | Seymour | 65/106 |

Primary Examiner—Arthur D. Kellogg
Attorney, Agent, or Firm—Edward I. Mates

[57] ABSTRACT

A flat glass sheet of a given outline configuration is supported in a shaping station by a combination of a gas hearth bed portion and readily replaceable flat plate means comprising spaced plates having spaced edges of conforming shape that define an elongated slot conforming to the outline shape of at least a portion of the periphery of the flat glass sheet. The gas support bed portion provides hot gas under pressure to float the flat glass, and the flat plate means is located in close proximity to an end of the gas hearth bed portion to provide a narrow space at the level of the gas hearth bed portion for escaping gas between the flat plate means and the extending glass sheet portion to limit sag of the extending glass sheet portion. The flat plate means may be covered by material that does not mar hot glass, such as boron nitride, in case the glass sheet portion sags a limited distance to slide in contact with the flat plate means before it is lifted on a shaped, ring-like member.

13 Claims, 3 Drawing Figures

SUPPORT FOR HOT GLASS SHEETS OF NON-RECTANGULAR OUTLINE PRIOR TO BENDING

BACKGROUND OF THE INVENTION

1. Field of the Invention

The present invention relates to the shaping of glass sheets. More particularly, though not exclusively, the present invention relates to the shaping of glass while at least a portion of the glass sheet is supported on a bed of hot gas and lifted with an outline portion thereof supported on an outline lifting member into conformity with a vacuum holder of complementary shape to that of the outline lifting member. In a specific embodiment of the present invention, the vacuum holder comprises a vacuum chamber with a downward facing wall that is apertured for applying suction to the vacuum chamber communicating with the apertures through the downward facing wall of the upper shaping mold. The wall has a main portion that is substantially flat or gently curved and one or more end portions that are more sharply bent relative to the main portion.

In the past, a gas hearth bed supported the glass sheet for conveyance into the shaping station. The glass sheet, on arrival at the gas hearth bed portion within the shaping station, was lifted on an outline lifting member into conformity with a vacuum holder. When the gas hearth bed portion was larger than the sheet to be shaped, it had to be provided with a continuous recess within its outline for receiving the outline lifting member. When the gas hearth portion had an outline slightly smaller than the glass sheets being shaped, the outline lifting member, when lowered, surrounded the gas hearth bed portion within the shaping station. In either case, it was necessary to provide a unique gas hearth bed portion having either an outline shape or a grooved portion that conformed to the outline of the glass sheet supported thereon. Prior attempts to provide a gas hearth bed portion of rectangular outline small enough to accommodate all sizes of glass sheets to be bent was impractical, because the overhanging portions of the flat glass sheet that were bent relative to the main body portion tended to sag uncontrollably in their unsupported regions until the lifting member engaged the glass sheet to lift the glass sheet from its position of alignment with respect to the gas hearth bed portion to a position of engagement with the vacuum holder, particularly with glass sheets of larger extent than the gas hearth portion in the shaping station.

Vacuum holders moved vertically relative to the flat glass sheet to suck up the glass against the flat portion of the vacuum holder, which then lifted the glass sheet held by suction thereagainst until a gap of sufficient size developed to permit introducing a shaping member such as a tempering ring between the vacuum holder and the gas hearth portion. The glass sheet was shaped by drop forming the sheet released from the vacuum holder onto the tempering ring. Initially, the shape that could result was limited in its applicability to relatively flat sheets. Recently, however, more complicated bends have been required of the glass which required the use of auxiliary lifting members to engage the opposite end portions of the glass sheet to bring the heat-softened glass into engagement with the curved end portions of a vacuum holder. In the past, the extending end portions were free to sag during the time beginning when the glass sheet arrived in position at the shaping station, and ending with the lifting of the glass sheet. The latter lifting did not necessarily compensate for the sagging that occurred during the interval when the glass sheet waited to be lifted above the position of support provided by the gas hearth bed portion.

The prior art failed to provide a solution to the problem of avoiding excessive sag of the extended portions of the glass sheet without requiring the substitution of a gas hearth portion of conforming outline shape or having an outline groove of requisite shape every time there was a change in the pattern being produced. Such a change was both expensive and time consuming.

2. Description of Patents of Interest

U.S. Pat. No. 3,468,645 to McMaster et al discloses a glass bending operation in which a flat glass sheet is supported by hot gas and delivered onto a gas hearth portion where it is lifted by a frame-like member adapted for movement between a recessed portion within a continuous groove in the gas hearth portion and an upward position in mating relation with an upper shaping member, which may be a vacuum-type mold. This apparatus requires the replacement of the gas hearth portion with one having a continuous groove conforming to approximately the outline shape of a different glass sheet required to be bent every time the production pattern changes.

U.S. Pat. Nos. 3,682,613 to Johnson et al and 3,846,104 to Seymour each disclose a ring-like mold in surrounding relation to the gas hearth portion. Thus, if the gas hearth extension were provided with small enough rectangular outline to permit the handling of a wide variety of glass sheet sizes, the ring-like mold adapted to engage and lift larger parts in surrounding relation to the gas hearth portion had to be spaced a considerable distance from the perimeter of the gas hearth portion to engage larger sheets near their margin. This would provide a space therebetween for glass sheets having larger dimensions than the gas hearth extension that would permit uncontrolled sagging. Otherwise, the gas hearth bed portion has to be replaced by a portion of a size sufficient to fit within the lifting mold.

U.S. Pat. No. 4,229,200 to Seymour shows a lifting frame 126 with a curved shaping rail 124 at each end. The lifting frame surrounds a hearth block or gas hearth bed portion in its lower position in combination with a vertically moving vacuum holder that moves downward in position to engage the center portion of a flat glass sheet and to have the curved shaping rails 124 lift the glass against a corresponding curved end portion of an upper vacuum holder. The vacuum holder supports the glass by vacuum and improves its shape by continuing to apply the vacuum when the lifting mold 126 is lowered and the vacuum holder raised to permit the entry of a shaping mold 128 on a shuttle 61. The vacuum holder releases the glass sheet shaped thereagainst to permit the glass sheet to fall and to be shaped by drop forming the sheet by impact onto the shaping mold 128 into the shape corresponding to that of the shaping mold 128. The latter then moves the shaped glass sheet into position between upper and lower nozzles which cool the glass.

In this patent, also, since the glass sheet is shaped to a relatively sharp bend at each end, the flat glass sheet extends a considerable distance beyond the ends of the gas hearth portion 125 so the glass is not prevented from sagging in its unsupported end portions during a critical time just before the curved shaping rails 124 engage and lift the glass into conformity with the vacuum mold.

This invention has found a way to support one or more end portions that extends beyond the outline of the gas hearth bed portion to avoid the uncontrolled sagging or the need for substituting gas hearth portions conforming to different outline patterns in many cases where changes in pattern are required to meet customer requirements.

SUMMARY OF THE INVENTION

The present invention is useful in shaping glass sheets delivered to a shaping station on a gas hearth bed having an essentially horizontal, flat, upper wall, with apertures extending through the flat upper wall and means to impart hot gas under pressure through certain of said apertures to form a gas hearth bed portion upon which the intermediate portion of a glass sheet to be shaped may be supported on arrival at the shaping station. The present invention provides flat plate means adjacent at least one of the opposite sides of a gas hearth bed portion. The flat plate means of the present invention comprises at least a pair of spaced plates of a refractory material having upper surfaces aligned with the upper surface of the flat upper wall of the gas hearth bed portion. A ring-like member defining the elevational contour and plan outline approximating that desired for the glass sheet after bending surrounds the gas hearth bed portion and has end portions aligned with the space between the flat plates. The space between the flat plates defines an elongated curved slot conforming to the contour of a portion of the outline of the glass sheet aligned with the corresponding flat plate means. The flat plate means provides an extension for the gas hearth bed portion and is free from perforations, except for the space between the plates, which enables the ring-like member to move from a recessed position below the flat upper wall of the gas hearth bed portion and below the flat plate means into an elevated position above the gas hearth bed portion and said flat plate means through the one or more elongated curved slots provided by the space between the flat plates.

Hot gas is supplied through certain apertures in the gas hearth bed portion to provide a bed of hot gas between the upper wall of the gas hearth bed portion and the lower surface of the glass sheet. Gas applied to the lower glass sheet surface is deflected and at least a portion of the deflected gas moves out beyond the ends of the gas hearth portion into the space between the flat plate means and the lower surface of the portions of the glass sheet beyond the gas heart portion to provide support to prevent the portions of the glass sheet beyond the gas hearth portion from sagging uncontrollably during the period immediately before the ring-like member lifts the glass into engagement with the upper vacuum holder. However, even if the extending portion of the glass sheet sags into contact with the flat plate means, the latter is provided with a coating of a material that can withstand sliding contact with the hot glass sheet portion without harming the glass. In this manner, the glass sheet that results from the bending operation has improved optical properties.

These and other benefits of the present invention will be understood in the light of a description of a preferred embodiment that follows.

BRIEF DESCRIPTION OF THE DRAWINGS

In the drawings that form part of the description, and wherein like reference numbers refer to like structural elements.

DESCRIPTION OF THE PREFERRED EMBODIMENT

Figure 1:
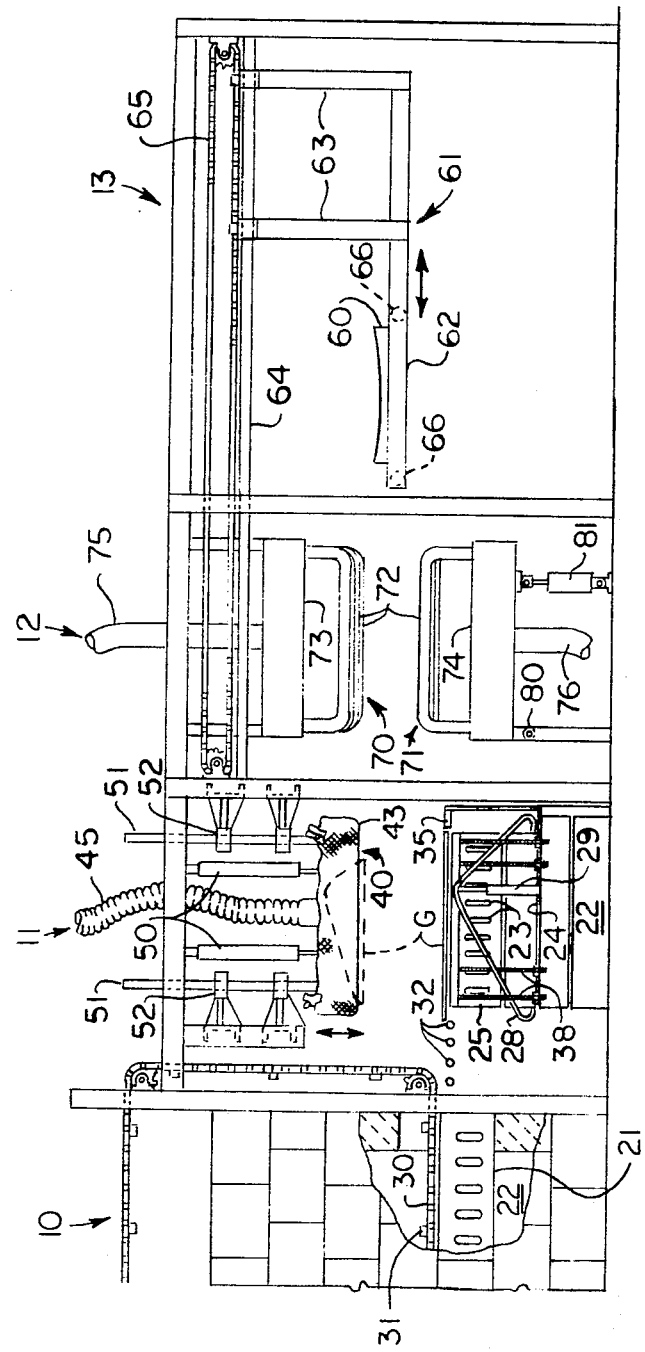
FIG. 1 is a longitudinal side view of a specific preferred embodiment of a glass sheet bending and tempering apparatus incorporating the features of the present invention.
Figure 2:
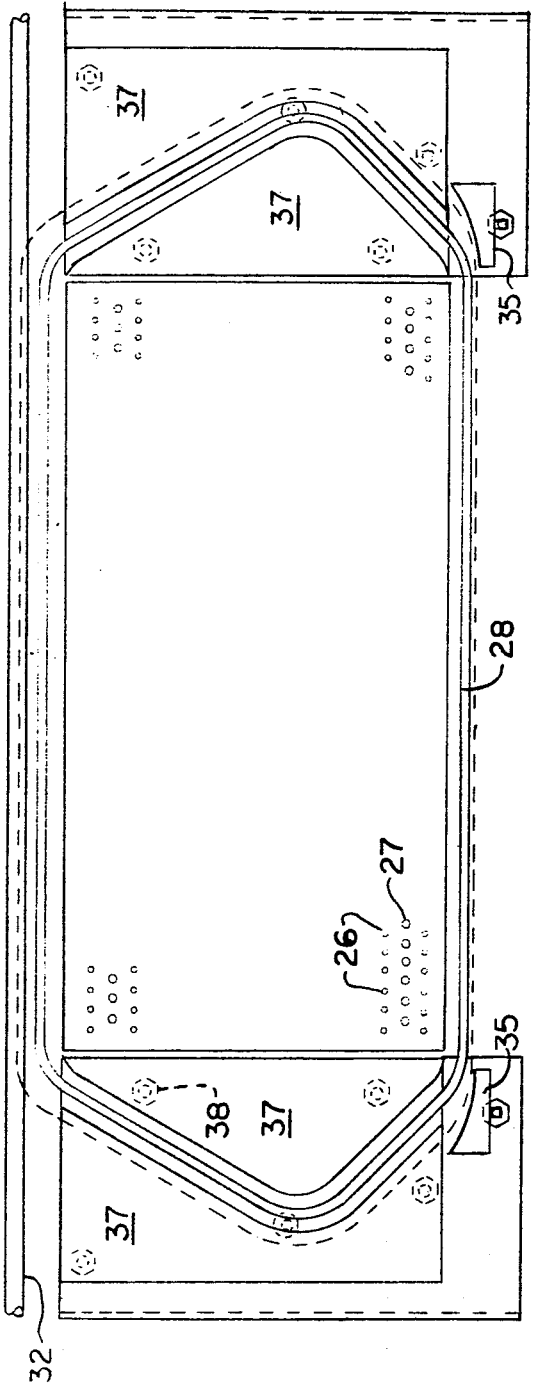
FIG. 2 is a plan view of the lower portion of the shaping station forming part of one embodiment of the present invention.

Referring to the drawings, and particularly to FIG. 1, a typical shaping and tempering apparatus for which the present invention is extremely beneficial includes a furnace 10 (only the downstream end of which is shown), a shaping station 11, a cooling station 12 and an unloading station 13 disposed in end to end relation. The furnace, the cooling station and unloading station form no part of the present invention, and the description of a specific embodiment herein is included for the purpose of illustration only. Any arrangement known in the art for heating and tempering a series of horizontally disposed glass sheets may be employed in connection with the shaping apparatus of the present invention and its method of employment. Accordingly, only a brief description of the elements of the apparatus that form part of the background of the invention, such as the furnace, the cooling station and the unloading station, will be described in this specification. Additional details regarding these aspects of the overall bending, shaping and tempering apparatus may be obtained from U.S. Pat. Nos. 3,846,104 and 4,229,200 to Seymour, the disclosures of which are incorporated herein by reference.

Figure 3:
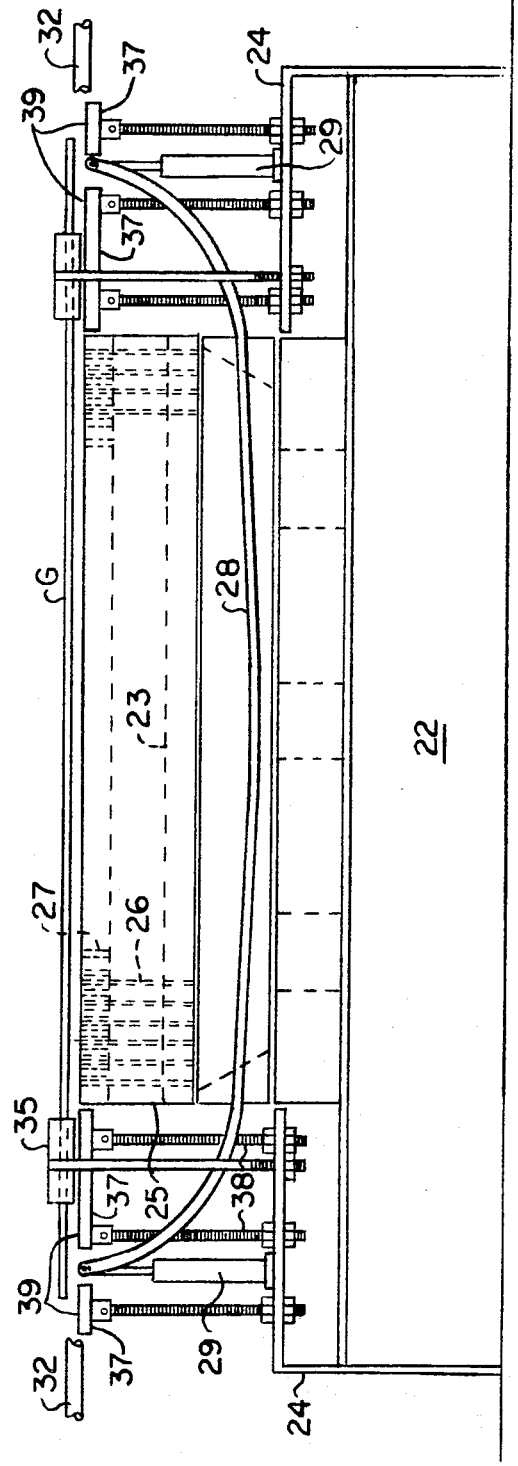
FIG. 3 is a transverse elevational view of the lower portion of the shaping station of the present invention showing the glass sheet having arrived at the shaping station and ready to be lifted by a ring-like member.

The furnace 10 is preferably of the gas hearth type, wherein glass sheets are supported on a layer of hot gases as they are heated and conveyed through the furnace. Examples of gas support furnaces for heating glass sheets are found in U.S. Pat. No. 3,223,501 to Fredley et al and in U.S. Pat. No. 3,332,759 to McMaster et al. In the cut-away portion of the furnace in FIG. 1, the gas support bed is defined by a furnace hearth block 21 through which a large number of vertical bores or supply passages 26 and 27 extend (See FIG. 3). Some of the vertical bores 26 extend through the entire thickness of the gas hearth block 21 and communicate the upper surface of the furnace hearth block with hot, pressurized gases from a hot gas plenum chamber 22 and others extend only partly through the thickness of the block 21 to communicate the top surface of the hearth block with horizontally extending cross-bored passages 23. A similar hot gas plenum chamber 22 communicates with a hearth block portion 25 located in the bottom portion of the shaping station 11 through similar passages 26 and provides exhaust through passages 27 and 23. Support structure 24 whose purpose will be described later is located adjacent the hot gas plenum chamber 22 in the lower portion of the shaping station 11.

A ring-like lifting member 28 conforming in elevation and outline to the shape of the glass sheet after bending surrounds the gas hearth portion 25. A pair of pistons 29 or other actuating means is provided to move the lifting member 28 between a lowered position surrounding the gas hearth portion 25 and an elevated position engaging a lifted glass sheet against the lower wall of a vacuum holder to be described later. The pistons 29 are supported on the support structure 24.

FIG. 1 shows a typical arrangement for conveying glass sheets through the furnace 10 as they are supported on a film of hot gas. The conveying mechanism in the furnace comprises a pair of parallel endless chains 30 flanking the path of glass sheet movement inside the furnace. The endless chains are joined by a plurality of pusher bars 31. At the furnace exit, each glass sheet is released from the chain conveying means and driven at an accelerated speed across a transfer conveyor into the shaping station 11 by rotating take-out rolls 32. The hearth block portions 21 and 25 has essentially flat upper apertured walls and may be provided with a downward slope on the order of 1 to 2 degrees to aid the forward movement of the glass sheets. Sufficient gas presssure is supplied through the supply passages 26 to maintain a gas pressure between the upper surfaces of the hearth block portions and the glass sheets so as to float the glass sheets at a level of approximately 1/16 inch (1.6 millimeters) above the upper surface of the hearth blocks. The take-out rolls 32 of the transfer conveyor section project above the upper surfaces of the hearth blocks just enough to make rotating contact with the lower major surfaces of the moving glass sheets.

When a glass sheet arrives at the shaping section 11, its forward progress is stopped by a locator means 35 near the downstream end of the shaping station. The locator means 35 may be supported wherever convenient such as on the support structure 24 adjacent the plenum chamber 22. The gas hearth bed portion 25 is flanked by flat plate means. The latter comprise inner and outer plates 37 of a high temperature resisting fibrous ceramic material such as Marinite ®#2, sold by Johns Manville. The plates are about one inch (2.5 centimeters) thick and have an upper flat plate surface that provides an extension of the flat upper surface of the gas hearth block portion 25 at the shaping station 11. Each of the plates 37 is attached to the upper portion of a plate attachment means 38 that connects each plate 37 at an adjustable height for its upper surface relative to the convenient support structure 24. Since the plates 37 are adjacent hot glass and hot gases during a shaping operation, means is provided to make the plate attachment means 38 adjustable for thermal expansion in any manner well known in the art. The upper facing surface of each of the plates 37 is covered with a coating 39 of a material adherent to the plates 37 that is durable at elevated temperatures of the glass sheet at the shaping station and does not harm heated glass nor is harmed thereby when the hot glass slides thereover. A preferred material is boron nitride. However, other suitable materials, such as graphite, magnesium oxide and titanium oxide compositions, may be substituted.

The apparatus also comprises an upper vacuum holder 40 having a downwardly facing apertured wall of relatively flat or gently curved configuration in its main portion terminating in curved end portions conforming to the shape desired at the curved ends of the glass sheet. The downwardly facing wall is complementary in shape to that of the ring-like lifting member 28. The apertured wall forms the floor of a hollow interior vacuum chamber. A vacuum conduit 45 is provided to communicate the hollow interior chamber of the vacuum holder with a source of vacuum.

The lower wall of the upper vacuum holder 40 is covered with a fiber glass protective cover 43 to protect the surface of hot glass sheets. A typical, desirable cover is a stretchable, knit, fiber glass cloth disclosed in U.S. Pat. No. 3,148,968 to Cypher et al, the disclosure of which is incorporated by reference in the present disclosure.

The area of the upper vacuum holder 40 should be greater than the total area of the largest glass sheet to be received at the shaping station 11. The area of the gas hearth portion 25 in the shaping station 11 is less than that of the smallest glass sheet processed, but the area of the flat plate means is greater than the glass sheet portion extending beyond the gas hearth portion 25.

When the glass sheet shaping apparatus is of the drop forming type disclosed in U.S. Pat. No. 4,229,200 to Samuel L. Seymour, the details of the construction of the vacuum holder and various embodiments which are described in detail in the aforesaid patent are incorporated herein by reference. For example, instead of having a single vacuum conduit 45 communicating the interior chamber of the vacuum platen to a source of vacuum, the end portions may be compartmentalized and provided with individual vacuum conduits to stronger sources of vacuum to help conform the end portions of the glass sheets to the curved shape imparted thereto during the shaping process, since a stronger holding force is needed to engage a sharply shaped glass sheet region to a vacuum holder than a flat region.

The vacuum holder 40 is capable of vertical movement, and such vertical movement is optional if provided. Means to move the vacuum platen 40, such as hydraulic cylinders 50 and guide rods 51, are provided. The guide rods slide in fixed sleeves. The cylinders 50 reciprocate the vacuum holder between a raised position separated from the upper surface of the hearth block portion 25 and a lowered position in which the vacuum holder 40 is brought closely adjacent to, or in contact with, the locator means 35, which guide the positioning of the glass sheet or sheets on arrival at the shaping station 11. The vacuum holder 40 need not come into contact with the upper surface of the glass sheet at the shaping station 11 in order to lift it. The amount of vacuum required, the number of perforations and the size of the perforations are selected according to the criteria recited in U.S. Pat. No. 4,229,200 to Seymour to provide optimum results. With the glass sheet or sheets drawn against the under surface of the bottom wall of the vacuum holder 40, the latter is raised to the elevated position and the pistons or equivalent lifting means 29 lift the ring-like lifting member 28 into position to conform the end portions of the glass sheet against the curved end portions of the vacuum holder 40. When the vacuum holder 40 is raised holding the glass sheet thereagainst by vacuum and the ring-like lifting member 28 is lowered to its position surrounding the gas hearth portion 25, sufficient clearance is provided to insert an outline shaping mold 60 between the gas hearth portion 25 and the platen 40. The shaping mold conforms to the outline and contour of the bent glass sheet and is preferably constructed according to the disclosure of U.S. Pat. No. 3,973,943 of Seymour, the disclosure of which is incorporated herein by reference. The shaping mold is preferably of the outline ring type, is light in weight and notched along its upper edge in order to provide minimum interference with the flow of air during tempering.

The shaping mold 60 is carried on a shuttle 61 for horizontal transfer between the shaping, cooling and unloading stations. In this specific embodiment illustrated, the shuttle consists of a pair of cantilevered beams 62 supported at one end by vertical braces 63, the upper ends of which are aligned to slide along a pair of horizontal guide rolls 64. A continuous chain 65 to which the upper ends of the braces 63 are affixed drives the shuttle 61 along a horizontal path using an electric motor (not shown) to drive the continuous chain. Cross braces 66 may support the shaping mold on the shuttle.

The cooling station 12 comprises an upper tempering apparatus 70 and a lower tempering apparatus 71. Pipe modules 72 communicate with the upper and lower tempering apparatus to deliver cold air blasts from an upper cold air manifold 73 and a lower cold air manifold 74. Then manifolds receive cold air under pressure from pressure sources through supply ducts 75 and 76, respectively. The upper supply duct 75 communicates with the upper manifold 73 and the lower supply duct 76 communicates with the lower air manifold 74. The pipe modules 72 are adjustable in the vertical direction with respect to the cold air manifolds 73 and 74 with which they communicate so that the pipe modules may be adjusted to provide uniform spacing relative to the opposite surfaces of the curved glass sheets to be treated.

The lower cold air manifold 74 is pivotally supported on a support structure by a pivot 80 and cylinder means 81 on the side opposite the pivot 80 to pivot the lower pipe modules 72 downwardly when the need arises to clear glass fragments from the cooling station.

The unloading station beyond the cooling station may be any one of various well known apparatus of the prior art. Alternatively, cool glass sheets may be removed by hand after tempering.

Means is provided to reciprocate the shuttle means 61 on which the shaping mold and glass sheets are carried in a horizontal path of movement when the shuttle 61 is between the modules 72. This reciprocation takes place while cold air blasts are directed onto glass sheets. This relative motion between the modules and the glass avoids the establishment of islands of iridescence in the tempered glass sheets.

In a typical arrangement for the present invention, a succession of glass sheets are transported transversely of their length in floating relation over the furnace hearth block portion 21 and the take-out rolls 32 and into floating relation over the flat upwardly facing apertured surface of the hearth block portion 25 in the shaping station 11 where the glass sheet is brought into abutment against the locator means 35. Since the length of the glass is longer than the transverse dimension of the hearth upwardly directed gases that support the glass sheet in floating relation over the upper wall of the various hearth block portions, are diverted between the lower glass surface and the upper wall of gas hearth portion 25 to flow outwardly into the area between an adjacent end portion of the glass sheet and the flat plate means to help support the adjacent end portion of the glass sheet in closely spaced relation over the flat plates 37. It is understood that whenever a change of product is needed, the flat plate means 36 including its closely spaced plates 37 for supporting an adjacent end of the glass sheet may be replaced by other plates defining a slot therebetween conforming to a different shape and/or outline of the glass, and locator means 35 conforming to the different glass outline shape is provided with the substituted plates 37.

It is understood that in the absence of the flat plate means, the upward pressure component of the escaping gas would be insufficient to provide a support to prevent the extended portions of the glass sheet from drooping and sagging uncontrollably so as to make it very difficult for the end portions of the ring-like lifting member 28 to lift the glass sheet into closer relation to the shape of the vacuum holder 40 at the curved end portions thereof. The presence of the flat plate means limits undesired sagging.

When the glass sheet arrives at the shaping station 11, the vacuum holder 40 is lowered into close proximity to the upper surface of the glass sheet aligned against the locator means 35, and the suction applied to the upper vacuum holder causes the central portion of the flat glass sheet to be brought into engagement against the relatively flat central portion of the lower apertured wall of the upper vacuum holder 40. Immediately afterwards, the ring-lifting means 29 operates to raise the ring-like lifting member 28 into a position in which the latter sandwiches the adjacent end portion of the glass sheet against the corresponding curved end portion of the upper vacuum holder 40. Suction in the end portion of the vacuum holder 40 holds the shaped end portion of the glass sheet thereagainst. After this, the vacuum holder 40 is raised and the ring-lifting means 29 lowered to provide a gap sufficient for clearance for the shuttle 61 to deliver the mold 60 into position below the upper vacuum holder 40 and the hearth block portion 25. The ends of the ring-like lifting member 28 are held in a lowered position surrounding the hearth block portion 25. As an alternative, the vacuum holder 40 may remain stationary and the ring-like lifting member 28 moves vertically to lift a hot glass sheet into engagement with the vacuum holder and then is lowered to its initial position surrounding the gas hearth portion 25.

When the mold 60 moves into position beneath the vacuum holder 40, vacuum is discontinued with pressure being applied as desired, and the glass sheet falls freely onto the shaping mold. The momentum imparted to a glass sheet by its free fall preferably provides an essential portion of the bending force to conform the glass sheet to the contour of the shaping mold. Although some minor sagging due to the force of gravity may be expected to take place after the glass sheet has come to rest on the shaping mold, its magnitude is insignificant relative to the bending produced by the force generated by the momentum of the dropping of the glass sheet onto the shaping mold. Sagging is a relatively slow process, and in the present invention, cooling is preferably initiated in a minimum amount of time which provides insufficient time for a significant amount of gravity-induced sagging to take place after the shaping that takes place by momentum.

By having the readily replaceable plates 37 located with their upper surfaces in approximately the same plane as the upper flat wall of the gas hearth block portion 25, the portions of the glass sheets of irregular outline that extend beyond the portion supported on the gas hearth portion 25 are prevented from developing excessive reverse curvature before the glass end portion is lifted into pressurized engagement between the end portion of the upper vacuum holder 40 and the corresponding curved end portion of the ring-like lifting member 28. Covering the plates with boron nitride reduces and virtually eliminates the marking that takes place on the glass sheet end portion even when it sags to contact the upper flat surface of the plates. Boron nitride provides a low friction surface that enables a sagged glass sheet portion to slide along the plate until the ring-like lifting member 28 takes over the support of the peripheral portion of the glass sheet.

By virtue of the present invention, it is unnecessary to replace the relatively massive hearth block portion 25 for each different pattern. The relatively easy replacement of the flat plate means to provide an arcuate slot of appropriate shape between its individual plates 37 facilitates the operation of the apparatus to provide glass sheets of different patterns with a relatively easy means of changing just the plates rather than the relatively difficult requirement to substitute one hearth block portion 25 for another. Changing the apparatus to produce a different pattern is comparatively easy because of the present structure. Furthermore, should there be insufficient escaping gas to maintain the end portions of the glass sheet is spaced relation above the flat plate means in the plane of the upper surface of the upper flat wall of the hearth block extension 25, the presence on the flat plates 37 of a cover of a material that does not harm the glass, such as boron nitride, permits the glass end portions facing the flat plates 37 to develop only limited sag before they come into contact with the upper surface of the plates 37 and provides a limited amount of sliding contact thereover with no impairment of optical properties.

It is shown in the illustrative embodiment that the flat plate means are provided flanking the longitudinal ends of the hearth block extension. The present invention also makes it possible to utilize this teaching along the downstream side edge of the hearth block portion 25 to provide means to limit downward sagging in the leading edge portion of a flat glass sheet so that when the sheet is lifted on the ring-like lifting member 28 it remains relatively flat prior to lifting and requires a minimum of distortion to obtain the desired shape required for the glass.

Typical operating parameters to obtain successful bends of the preferred embodiment of the invention has been performed with glass sheets 5 millimeters thick. Under different conditions the data vary. The furnace atmosphere was maintained at a temperature of about 1300° F. (705° C.). The gas supplied through the hearth block portion 25 in the bending zone was typically in the range of approximately 1100° F. to 1300° F. (593° C. to 705° C.), a typical successful temperature being in the vicinity of 1250° F. (677° C.). Vacuum holder 40 attained a temperature in the range of 500° F. to 700° F. (260° C. to 371° C.) after a period of operation due to its proximity to the hot gases from the hearth block portion 25. The glass is typically at a temperature of approximately 1210° F. (655° C.) when picked up by the vacuum holder. A total of about 6 seconds elapsed from the time of glass pickup until the initiation of the cooling step, at which time the glass had cooled to about 1190° F. (643° C.). About 3 seconds elapsed from the time the glass was dropped onto the shaping mold 60 until cooling was started. All together, about 10 seconds was required from the time the glass passed from the furnace exit, was shaped and entered the cooling station. These times are illustrative only as various factors such as the relative mass of the glass sheet in the furnace and the furnace itself, the severity of bend imparted to the glass, the heat capacity of the furnace, the glass temperature on leaving the furnace and arriving at the shaping station, for example, will determine the time needed for each cycle.

The ring-like lifting member 28 is shown in the illustrated embodiment in the form of a continuous ring. It may also be in the form of a sectionalized ring of the type depicted in FIGS. 21 to 24 of U.S. Pat. No. 4,229,200 to Seymour, which has already been incorporated in this description by reference.

The description of a preferred embodiment described in this specification represents an illustrative example of the present invention. It is understood that various changes may be made without departing from the gist of the invention as defined in the claimed subject matter which follows.

I claim:

1. Apparatus for supporting a flat glass sheet in position to be lifted by a ring-like lifting member having a plan outline and curved elevational shape conforming to that desired immediately within the perimeter of said glass sheet, said apparatus comprising a gas hearth bed portion having at least one dimension shorter than the corresponding dimension of said flat glass sheet, said ring-like lifting member surrounding said gas hearth bed portion, said bed portion having an essentially horizontal, flat, apertured upper wall, means to impart hot gas through said upper wall at a rate sufficient to float said glass sheet in closely spaced relation to said flat upper wall and to permit at least some of said hot gas to be deflected to flow beyond the edge of said upper wall, flat plate means supported adjacent an end of said upper wall and extending essentially horizontally therefrom to be in position to form an extension of said upper wall, said flat plate means comprising a pair of flat imperforate plates spaced from one another in a common essentially horizontal plane to define an elongated groove conforming to a portion of the periphery of said glass sheet, means for moving said ring-like member between a recessed position below said upper wall and said flat imperforate plates through said elongated groove between said flat imperforate plates.

2. Apparatus as in claim 1, including a coating of a material that does not mar or scratch glass applied to the upper surface of said imperforate plate member.

3. Apparatus as in claim 2, wherein said coating is composed of boron nitride.

4. Apparatus as in claim 1, further including a vacuum holder having a downwardly facing apertured lower wall vertically aligned over said ring-like lifting member, a vacuum chamber above said lower wall, and means to couple said vacuum chamber to a vacuum source and to release said vacuum chamber from said vacuum coupling.

5. Apparatus as in claim 4, wherein said vacuum holder has a downwardly facing apertured lower wall approximately conforming to the shape desired for said glass sheet after bending and comprising a major portion having a relatively flat or gently curved configuration and an end portion having a relatively sharply curved configuration beyond said portion of relatively flat configuration, and said ring-like lifting member has a shape conforming in elevation and outline to that of the downwardly facing apertured wall of said vacuum holder.

6. Apparatus as in claim 5, further including means to move said vacuum holder vertically between a position adjacent said flat, upper wall of said gas hearth bed portion and an upper position, a cooling station downstream of said shaping station, a transfer mold movable in an essentially horizontal path into and out of said shaping station and into and out of said cooling station, means for moving said ring-like lifting member from said position surrounding said gas hearth bed portion to a raised position to bear against said lower apertured wall of said vacuum holder when the latter occupies its said upper position, means to couple said vacuum chamber to said vacuum source, means to return said ring-like lifting member to said position surrounding said gas hearth bed portion when said glass sheet is held by vacuum against said vacuum holder, shuttle means to move said transfer mold into said shaping station when said vacuum holder occupies its upper position bearing said glass sheet thereagainst and said ring-like member has resumed its position surrounding said gas hearth bed portion, means to release said vacuum chamber from said vacuum source when said transfer mold is beneath said vacuum holder and means to actuate said shuttle means to move said transfer mold from said shaping station to said cooling station via the space between said lower wall and said upper wall.

7. Apparatus as in claim 6, further including locator means supported in position at the downstream end portion of said shaping station for engagement by said glass sheet when said glass sheet occupies a desired position above said gas hearth portion at said shaping station.

8. Apparatus as in claim 1 or 2 or 3 or 4 or 5 or 6 or 7, further including second flat plate means similar in construction and arrangement to said first flat plate means supported adjacent an end portion beyond said major portion of said upper wall opposite said first-named end portion to extend in an opposite direction from said first flat plate means in said essentially horizontal plane.

9. Apparatus as in claim 8, further including third flat plate means supported adjacent a side of said upper wall intermediate said end portions beyond said major portion of said upper wall to extend outwardly of said side in said essentially horizontal plane.

10. Apparatus as in claim 7, further including means to replace readily said flat plate means with other flat plate means comprising spaced imperforate plates defining an elongated groove of different configuration therebetween.

11. A method of supporting a flat glass sheet having a main portion and an end portion extending therefrom, comprising supporting the main portion thereof by gas in closely spaced relation over an upper, apertured wall of a gas hearth bed portion and supporting said end portion of said flat glass sheet extending from said main glass sheet portion in closely spaced relation to imperforate flat plate means extending from said upper apertured wall to a position in a common support plane slightly below at least a portion of the periphery of said flat glass sheet, whereby at least some of said gas that supports the main portion of said flat glass sheet is deflected to move along the lower surface of said flat glass sheet through a position between said portion of said glass sheet periphery and said flat plate means to control sag in said end portion of said glass sheet.

12. A method as in claim 11, for supporting a glass sheet having another end portion extending from said main portion, further including supporting said other end portion in closely spaced relation to imperforate flat plate means extending from a different portion of said upper apertured wall to a position in said common support plane slightly below another portion of the periphery of said flat glass sheet, whereby some of said gas that supports the main portion of said flat glass sheet is deflected to move along the lower surface of said flat glass sheet through a position between said another portion of said periphery and said additional flat plate means to control sag in said other end portion of said flat glass sheet.

13. A method as in claim 11 or claim 12, including coating the upper surface of said imperforate flat plate means with a material that can withstand the temperature of the glass sheet and does not mar said glass sheet on sliding contact therewith prior to supporting said glass sheet thereover.

* * * * *